Nov. 9, 1937.  W. G. NORD  2,098,514

COUPLING FOR LUBRICATORS

Filed Oct. 27, 1931

INVENTOR:
WALTER G. NORD

BY Saywell and Wesseler
ATTORNEYS

Patented Nov. 9, 1937

2,098,514

UNITED STATES PATENT OFFICE 2,098,514

COUPLING FOR LUBRICATORS

Walter G. Nord, Amherst, Ohio, assignor, by mesne assignments, to Stewart-Warner Corporation, Chicago, Ill., a corporation of Virginia Application October 27, 1931, Serial No. 571,445

4 Claims. (Cl. 285—169)

My invention particularly relates to couplings adapted to be used with standard pressure apparatus, such as grease guns, the coupling being connected intermediate the gun and the member being lubricated. My improved coupling is particularly applicable for use with standard lubricating fittings secured to automobile parts. The purposes of the invention are to provide improvements of this character which can be economically manufactured and easily assembled, which can be conveniently operated and do not easily break or become defective in operation, and which effectively assist in the lubricating operation by automatically grabbing and clamping on the fitting through which the lubricant is being passed; and which completely seal the joint between the discharge end of the coupling and the receiving end of the fitting.

The annexed drawing and the following description set forth in detail certain means exemplifying my invention, such means constituting, however, but one of the various forms in which the principle of the invention may be embodied.

In said annexed drawing:

Figure 1 is an axial section of my improved coupling in detached position from a conventional lubricant fitting with which one end of the coupling is designed to cooperate, this lubricant fitting being shown in position upon the vehicle element requiring lubrication. This vehicle element is also shown in fragmentary section, as is also thus shown a lubricant-ejection nozzle forming part of a conventional pressure gun and with which the opposite end of the coupling engages;

Figure 1:
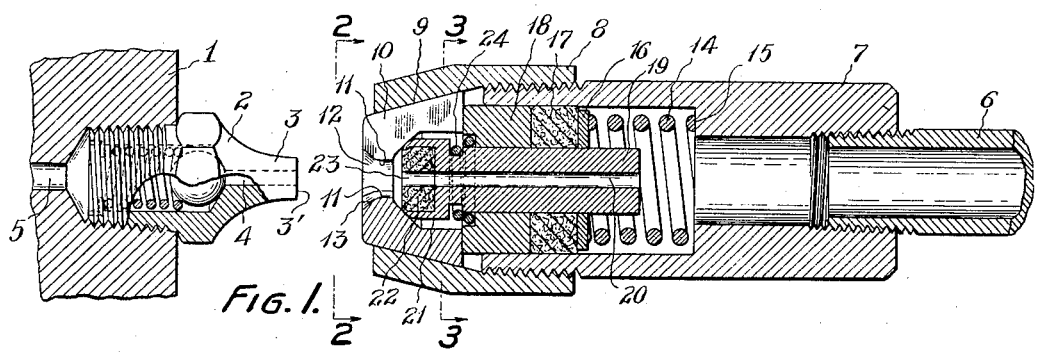

Referring to the annexed drawing in which the same parts are indicated by the same several numbers in the different views, a part of a vehicle element 1 which requires lubrication is provided with a conventional lubricant fitting 2 having an outwardly extended smooth-surfaced nipple portion 3. By "smooth-surfaced nipple portion", I mean a surface which does not present shoulders, flanges or other protuberances designed to cooperate with the clamping means of the coupling in the clamping or locking action. This nipple 3 is formed with a lubricant passage 4 communicating with a passage 5 leading to the parts in the vehicle 1 which require lubrication. I also show an externally-threaded lubricant-ejection nozzle 6 which is a part of standard and well known means forming a lubricant reservoir (not shown) from which lubricant is forced by a pressure gun outwardly through and from the nozzle 6. My improved coupling member is designed to cooperate with the nozzle 6 at one end and with the nipple 3 at the other end to pass lubricant from the pressure gun to the element 1.

Figure 4:
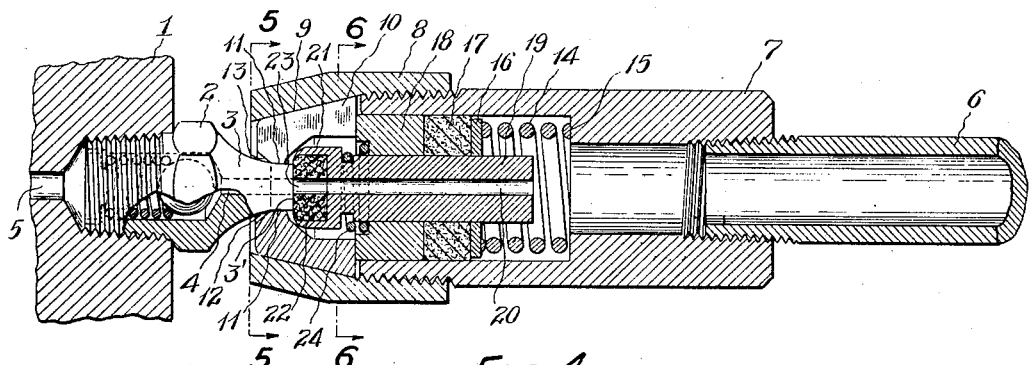
Figure 4 is a view similar to that shown in Figure 1, with the coupling and conventional fitting in operative engagement and the several coupling elements in lubricant-feeding position.
Figures 2, 3:
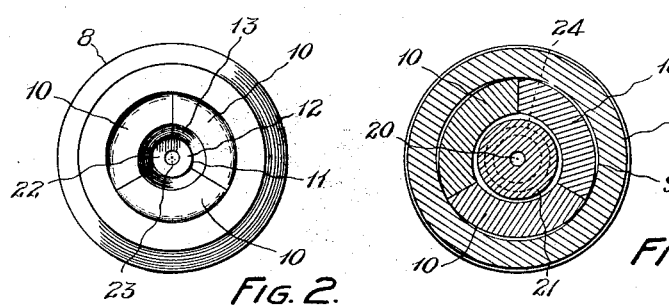
Figure 2 is an elevation, taken from the plane indicated by the line 2—2, Figure 1.
Figure 3 is a transverse section, taken in the plane indicated by the line 3—3, Figure 1.
Figures 5, 6:
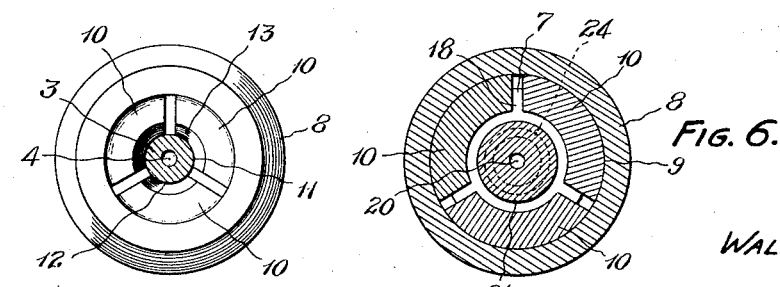
Figure 5 is an elevation and section, taken in the planes indicated by the line 5—5, Figure 4.
Figure 6 is a transverse section, taken in the plane indicated by the line 6—6, Figure 4.

This improved coupling comprises a cylindrical and longitudinally apertured main casing portion 7 which is internally threaded at one end to cooperate with an externally threaded portion of the nozzle 6, the main casing portion 7 being externally threaded at its opposite end to cooperate with an internally threaded hood or head 8 which extends at one end beyond the main casing portion 7 and is formed with an outwardly tapered inner surface portion 9. The main casing portion 7 and the head 8 form a casing for the clamping and sealing means described below. Upon this tapered surface portion 9 of the hood 8 are mounted multiple-jaw members 10, three such jaw members being shown in the form of device illustrated. These jaw members 10 are machined to form and, in their outermost position shown in Figure 1, closely register along their lateral edges and form a central nipple-receiving opening 12, as shown in Figure 2. These jaw members 10 slide inwardly and outwardly of the hood 8 and, as they move inwardly from their outermost position, become spaced one from the other more or less, as shown in Figure 5. Means controlling the inner and outer sliding movement of the jaw members 10 will be hereinafter fully described. These jaw members 10 are bent inwardly at their outer end portions to form clamps 11 adapted to grip the smooth outer surface of the nipple 3. However, the distance by which the terminals of the clamps 11 are spaced apart, in other words, the diameter of the nipple-receiving opening 12, is so small that this opening can not receive the nipple 3 until the jaws are forced inwardly upon the surface portion 9, as shown in Figure 4. This inward forcing of the jaws 10 is effected by forcing the terminal concave portions 13 of the jaws 10 against the nose 3' of the nipple 3, which nose gradually opens and separates the jaws 10 as they are forced inwardly of the hood 8 until the clamps 11 ride upon the nipple 3 which they automatically grab and clamp and thus become securely engaged therewith, as shown in Figure 4.

The above-described inward movement of the jaws 10 is effected against the resistance of a coil spring 14 bearing at one end against an internal shoulder 15 formed in the casing portion 7 and at the other end against a bearing washer 16 contained within the casing portion 7 and spaced by a gasket 17 from a block 18, the several members 16, 17, and 18 forming a piston and being of annular formation so as to accommodate a plunger 19 which extends at both ends beyond the piston 16—17—18. This piston 16—17—18, under the normal action of the spring 14, is forced somewhat outwardly of the casing portion 7 and abuts the inner ends of the jaws 10, as clearly seen in Figures 1 and 4. The plunger 19 is longitudinally apertured and is formed at its outer end with an enlarged portion 21 forming a housing for a sealing member 22 which abuts the nose 3' of the nipple 3 when the coupling member is clamped to the nipple. The longitudinal opening 20 in the plunger 19 communicates with a longitudinal opening 23 in the sealing member 22 so that a conduit for the passage of the lubricant from the ejection nozzle 6 through the casing portion 7 to the nipple aperture 4 is thus provided. The plunger 19 is movable longitudinally of the piston 16—17—18 through the medium of a coil spring 24 which has materially less tension than the spring 14 and which engages the front end of the block 18 of the piston and the rear end of the enlarged end member 21 of the plunger, as clearly shown in Figures 1 and 4. This spring 24 serves to maintain the sealing engagement of the member 22 with the nose 3' of the nipple 3 until the tight clamping of the jaws 10 upon the nipple is effected.

The inner and outer edges of the element whose subdivision forms the several jaw members 10 lie substantially in perfect circles, but after the element has been so subdivided, the inner and outer edges of the jaw members 10 do not form perfect circles, due to the thickness of the cutting tool with which the subdividing is effected. Therefore, these jaw members 10 take the irregular outline plainly shown in Figure 2. However, when the jaw members 10 have been spread an amount substantially the thickness of the cutting tool, the inner and outer edges of the jaw members 10 form substantially perfect circles, as approximately indicated in Figure 5.

The improvements above described provide coupling means between the pressure gun and the part being lubricated, and also provide automatic and efficient gripping means upon the smooth outer surface of the lubricating nipple and efficient sealing means at the junction of the coupling and the nipple, all as will be readily understood. I wish particularly to point out also that, if by reason of the clogging of the opening 4 in the nipple 3 or, for any other reason, the feeding of the lubricant through the channels 20, 23, and 4 is not being effected satisfactorily, the pressure thereby built up in the casing portion 7 is applied against the bearing washer 16 and hence applied to the piston and to the jaws 10 and sealing housing 21 to produce a more effective leak-proof joint between the sealing member 22 and the nose 3' of the nipple 3; which effective sealing joint is maintained until the part being lubricated can be rocked or tilted, or other corrective measures taken, to relieve the clogging or other untoward conditions.

What I claim is:

1. A coupling for lubricators comprising a tubular casing; a plurality of cooperating radially-movable jaws slidably mounted in the casing and forming a nipple-receiving opening; a spring-actuated piston slidably mounted in the casing and adapted to move the jaws longitudinally thereof; a plunger mounted in the piston and extended therethrough and longitudinally movable independently thereof and having a longitudinal aperture, said plunger being provided with an apertured sealing member disposed interiorly of the jaws; and a coiled spring disposed between said plunger and said piston for urging said sealing member toward said opening.

2. A coupling for lubricators comprising a tubular casing having an open-ended portion formed with an outwardly-tapered inner surface portion; cooperating jaws slidably mounted upon said surface portion and forming a nipple-receiving opening; a longitudinally-movable piston mounted in the casing and bearing at one end upon the inner ends of the jaws; a coiled spring normally holding the piston in its outermost position; a plunger mounted in the piston and extended therethrough and longitudinally movable independently thereof and having a longitudinal aperture, the outer end of said plunger forming a sealing member disposed adjacently interiorly of said nipple-receiving opening; and a coiled spring bearing at one end upon the front end of the piston and normally holding the plunger in its outermost position.

3. A coupling for lubricators comprising a tubular casing, said casing including a main casing portion and an open-ended outwardly-extended head engaging one end of the main casing portion and having an outwardly-tapered inner surface portion; a plurality of cooperating jaws slidably mounted on said tapered surface and normally extended outwardly of the head, the jaws forming a nipple-receiving opening leading inwardly of the casing; a spring-actuated piston mounted in the casing and normally holding the jaws in their closed position; a plunger mounted in the piston and extended therethrough and longitudinally movable independently thereof and having a longitudinal aperture, said plunger being formed with an enlarged end portion; an apertured sealing member in said plunger portion; and a coiled spring disposed between said plunger end and the piston and normally urging the sealing member toward the nipple-receiving opening.

4. A coupling for lubricators comprising a casing; cooperating jaws movably mounted at one end of said casing and forming a nipple-receiving opening; a piston slidable in said casing and adapted to move said jaws into clamping position; resilient means urging said piston to move said jaws; a plunger slidable in said piston and having one end near the inner end of said opening; a sealing member carried by said plunger end; and resilient means urging said plunger toward the inner end of said opening, said piston being between the said two resilient means and compounding the resilient action thereof.

WALTER G. NORD.